(12) United States Patent
De Oliveira et al.

(10) Patent No.: US 11,455,478 B2
(45) Date of Patent: Sep. 27, 2022

(54) CLOSED-SYSTEM CAPACITIVE COUPLING RFID

(71) Applicant: PRAGMATIC PRINTING LTD, Sedgefield (GB)

(72) Inventors: Joao De Oliveira, Sedgefield (GB); Brian Cobb, Sedgefield (GB); Thomas Clark, Sedgefield (GB)

(73) Assignee: PRAGMATIC PRINTING LTD, Sedgefield (GB)

( * ) Notice: Subject to any disclaimer, the term of this patent is extended or adjusted under 35 U.S.C. 154(b) by 0 days.

(21) Appl. No.: 17/264,645

(22) PCT Filed: Aug. 8, 2019

(86) PCT No.: PCT/GB2019/052229
§ 371 (c)(1),
(2) Date: Jan. 29, 2021

(87) PCT Pub. No.: WO2020/035663
PCT Pub. Date: Feb. 20, 2020

(65) Prior Publication Data
US 2021/0334486 A1    Oct. 28, 2021

(30) Foreign Application Priority Data

Aug. 13, 2018 (GB) ...................... 1813185

(51) Int. Cl.
*G06K 7/08* (2006.01)
*G06K 7/10* (2006.01)
*G06K 19/07* (2006.01)

(52) U.S. Cl.
CPC ..... *G06K 7/10366* (2013.01); *G06K 19/0709* (2013.01); *G06K 19/0723* (2013.01)

(58) Field of Classification Search
CPC .......... G06K 7/10366; G06K 19/0709; G06K 19/0723
(Continued)

(56) References Cited

U.S. PATENT DOCUMENTS

| 4,795,898 A | 1/1989 | Bernstein et al. |
| 4,876,535 A | 10/1989 | Ballmer et al. |

(Continued)

FOREIGN PATENT DOCUMENTS

| EP | 2372598 A1 | 10/2011 |
| WO | WO 87/06747 | 11/1987 |

(Continued)

OTHER PUBLICATIONS

International Preliminary Report on Patentability for International Application No. PCT/GB2019/052229, dated Feb. 25, 2021.
(Continued)

*Primary Examiner* — Ahshik Kim
(74) *Attorney, Agent, or Firm* — Jason H. Vick; Sheridan Ross, PC

(57) ABSTRACT

An RFID tag for capacitively coupled RFID communication with an RFID reader. The RFID tag comprising an integrated circuit (IC), the IC including a first RFID tag electrode arranged to capacitively couple with a first electrode of the RFID reader to form a first capacitor, and a second RFID tag electrode arranged to capacitively couple with a second electrode of the RFID reader to form a second capacitor when the RFID tag is in a first position relative to the RFID reader; power supply circuitry configured to extract power from a first time-varying signal received from the RFID reader via at least one of the first RFID tag electrode and the second RFID tag electrode, and supply the extracted power to circuitry of the RFID tag; and data transmission circuitry configured to receive the extracted power from the power
(Continued)

supply circuitry, and transmit data to the RFID reader via at least one of the first RFID tag electrode and the second RFID tag electrode.

15 Claims, 6 Drawing Sheets

(58) Field of Classification Search
USPC .......................................................... 235/451
See application file for complete search history.

(56) References Cited

U.S. PATENT DOCUMENTS

| | | | |
|---|---|---|---|
| 5,175,418 A | 12/1992 | Tanaka | |
| 6,879,809 B1 | 4/2005 | Vega et al. | |
| 2004/0160233 A1 | 8/2004 | Forster | |
| 2005/0173531 A1 | 8/2005 | Yoshioka | |
| 2006/0267772 A1* | 11/2006 | Knadle | G06K 7/0004 |
| | | | 340/572.4 |
| 2007/0241907 A1 | 10/2007 | Bauchot et al. | |
| 2008/0117047 A1 | 5/2008 | Collins et al. | |
| 2011/0241835 A1 | 10/2011 | Amtmann et al. | |
| 2011/0266883 A1* | 11/2011 | Eray | H01Q 7/00 |
| | | | 307/104 |
| 2014/0306805 A1* | 10/2014 | Jung | G06K 19/0723 |
| | | | 340/10.1 |
| 2018/0060615 A1* | 3/2018 | Ashwood-Smith | |
| | | | G06K 19/0716 |
| 2019/0392283 A1* | 12/2019 | Finn | G06K 19/0723 |
| 2020/0143218 A1* | 5/2020 | Lee | H04W 4/80 |
| 2021/0063455 A1* | 3/2021 | Stadlmair | G01R 27/2605 |

FOREIGN PATENT DOCUMENTS

| | | |
|---|---|---|
| WO | WO 02/099764 | 12/2002 |
| WO | WO 2015/144261 | 10/2015 |

OTHER PUBLICATIONS

International Search Report for International Application No. PCT/GB2019/052229, dated Nov. 11, 2019.
Written Opinion for International Application No. PCT/GB2019/052229, dated Nov. 11, 2019.
Combined Search and Examination Report Under Sections 17 and 18(3) for Great Britain Application No. 1813185.4, dated Feb. 4, 2019.

* cited by examiner

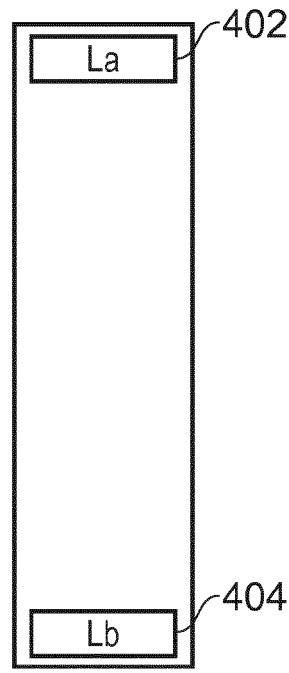
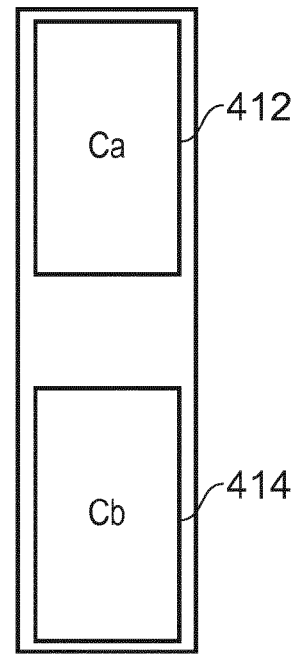
FIG. 4a  FIG. 4b
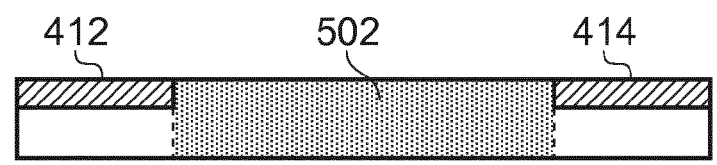
FIG. 5a
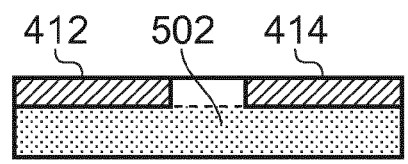
FIG. 5b
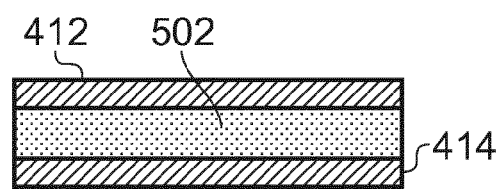
FIG. 5c

CLOSED-SYSTEM CAPACITIVE COUPLING RFID

CROSS-REFERENCE TO RELATED APPLICATIONS

This application is a national stage application under 35 U.S.C. 371 of PCT Application No. PCT/GB2019/052229 having an international filing date of 8 Aug. 2019, which designated the United States, which PCT application claimed the benefit of Great Britain Application No. 1813185.4, filed 13 Aug. 2018, each of which are incorporated herein by reference in their entirety.

FIELD OF THE INVENTION

The present invention relates to capacitively coupled Radio Frequency Identification (RFID), and in particular, RFID tags, RFID readers and RFID systems for capacitively coupled RFID communication.

BACKGROUND OF THE INVENTION

Radio Frequency Identification (RFID) has been in widespread use for a number of years in a wide range of applications, from asset tracking to personal identification and contactless payments for example. Conventional passive RFID tags receive power inductively from an RFID reader via an antenna to power its internal circuitry and communicate data back to the reader via inductive or backscatter mechanisms. However, when operating in the High Frequency range (e.g. approximately 3-30 MHz), the antennas are significantly larger than the RFID circuitry, thus placing limits on the miniaturisation of RFID tags that may be achieved.

In some applications, such as those in which the RFID reader and the RFID tag being read are in very close proximity (e.g. below 20 mm), power transfer and/or communication may be performed via capacitive coupling, for example, as set out in ISO10536. However, in order to transfer sufficient power from the RFID reader to the RFID tag, relatively large capacitor electrodes are required due to partial dependence between the power transfer capacity of a capacitor and the size of its electrodes. Consequently, whilst the electrodes of a capacitively coupled RFID tag may be smaller than the antenna of an inductively coupled RFID tag, the electrodes still present a barrier to the miniaturisation of RFID tags.

In view of the limits that conventional approaches to capacitively coupled RFID tags place upon the miniaturisation of RFID tags, there is a need for a new approach to the architecture of RFID readers and RFID tags that allow further miniaturisation of capacitively coupled RFID tags.

BRIEF SUMMARY OF THE DISCLOSURE

In accordance with an aspect of the present disclosure, an RFID tag for capacitively coupled RFID communication with an RFID reader is provided. The RFID tag comprises an integrated circuit (IC), the IC including a first RFID tag electrode arranged to capacitively couple with a first electrode of the RFID reader to form a first capacitor, and a second RFID tag electrode arranged to capacitively couple with a second electrode of the RFID reader to form a second capacitor when the RFID tag is in a first position relative to the RFID reader; power supply circuitry configured to extract power from a first time-varying signal received from the RFID reader via at least one of the first RFID tag electrode and the second RFID tag electrode, and supply the extracted power to circuitry of the RFID tag; and data transmission circuitry configured to receive the extracted power from the power supply circuitry, and transmit data to the RFID reader via at least one of the first RFID tag electrode and the second RFID tag electrode.

Advantageously, by providing the electrodes as part of the IC for capacitively coupled RFID communications, RIFD tags may be reduced in size since the use of large antennas that are required for inductively coupled RFID communication is avoided. Furthermore, the complexity and cost of manufacturing of RFID tags may be reduced since the use of separate external antennas or electrodes may be avoided. Such advantages may allow the application of such RFID tags to a wider range of scenarios.

In one example, the first RFID tag electrode and the second RFID tag electrode may be disposed on or below an outer surface of the IC.

In one example, the first RFID tag electrode and the second RFID tag electrode may be disposed on or below a same face of the outer surface of the IC.

In one example, the first RFID tag electrode and the second RFID tag electrode may be disposed on or below different faces of the outer surface of the IC In one example, the outer surface of the IC may include an insulating layer.

In one example, the first RFID tag electrode and the second RFID tag electrode may be arranged concentrically.

Advantageously, by providing flexibility in the placement of the electrodes with respect to the IC, the placement of the electrodes may be tailored to a specific application of the RFID tag, such as the shape of article to which the RFID tag is attached or the shape of the RFID reader. Furthermore, the electrodes may be placed in positions that improve the ease of manufacture of the IC.

In one example, the data transmission circuitry may be configured to transmit the data to the RFID reader via load modulation.

In one example, the data transmission circuitry may comprise a modulator configured to perform the load modulation in accordance with one or more of phase-shift keying (PSK), frequency-shift keying (FSK), amplitude-shift keying (ASK), and quadrature amplitude modulation (QAM).

In one example, the data transmission circuitry may comprise circuitry configured to generate a second time-varying signal for performing the load modulation.

In one example, the RFID tag may comprise memory circuitry configured to store the data for transmission to the RFID reader.

In one example, the RFID tag may comprise a third RFID tag electrode configured to capacitively couple with a third electrode of the RFID reader to form a third capacitor when the RFID tag is in a first position relative to the RFID reader, and wherein the third capacitor is configured to provide a reference voltage from the RFID reader to the RFID tag.

In one example, the RFID tag may be configured to be mounted on an external surface of an object, and wherein the first RFID tag electrode is configured to electrically connect to a first electrically conductive area of the external surface to increase the effective area of the first RFID tag electrode, and the second RFID tag electrode is configured to electrically connect to a second electrically conductive area of the external surface to increase the effective area of the second RFID tag electrode.

In one example, the RFID tag electrodes may be formed from metal.

In accordance with another aspect of the present disclosure, an RFID reader for capacitively coupled communication with an RFID tag is provided. The RFID reader comprises a first RFID reader electrode arranged to capacitively couple with a first electrode of the RFID tag to form a first capacitor, and a second RFID reader electrode arranged to capacitively couple with a second electrode of the RFID tag to form a second capacitor when the RIFD tag is in a first position relative to the RFID reader; driver circuitry configured to provide a first time-varying signal to the RFID tag via at least one of the first RFID reader electrode and the second RFID reader electrode; and data reception circuitry configured to receive data from the RFID tag via at least one of the first RFID electrode and the second RFID electrode.

In one example, the driver circuitry may comprise a signal generator configure to generate a predetermined signal, and resonant circuitry configured to form a resonant circuit with at least one of the first capacitor and the second capacitor and generate the first time-varying signal based on the predetermined signal.

In one example, the driver circuitry may comprise a signal generator configured to generate a predetermined signal, and a step-up transformer for transforming the predetermined signal to form the first time-varying signal.

In one example, the driver circuit may comprise a signal generator configured to generate a predetermined signal, and an amplifier for amplifying the predetermined signal to form the first time-varying signal.

Advantageously, by providing electrodes that capacitively couple to electrodes of an RFID tag, the use of large antennas may be avoided. Furthermore, by providing higher magnitude voltages at the electrodes of the RFID reader via generation of the first time varying signal, increased power may be transmitted to the RFID tag for a given electrode size and separation. Consequently, the size of the electrodes may be reduced and/or read distances increased for example, thus allowing the size of RFID readers and/or RFID tags to be reduced.

In one example, the data may be transmitted via load modulation from the RFID tag to the RFID reader in accordance with at one or more of phase-shift keying (PSK), frequency-shift keying (FSK), amplitude-shift keying (ASK), and quadrature amplitude modulation (QAM).

In one example, the data reception circuitry may comprise circuitry configured to generate a signal representing the load modulation, and a demodulator configured to demodulate the signal representing the load modulation to extract the data.

In on example, the first RFID reader electrode and the second RFID reader electrode may be disposed concentrically in the RFID reader.

In one example, the first RFID reader electrode and the second RFID reader electrode may be circular and disposed concentrically along a first axis in the RFID reader.

In one example, the RFID reader may comprise a third RFID reader electrode configured to capacitively couple with a third electrode of the RFID tag to form a third capacitor when the RFID tag is in a first position relative to the RFID reader, and wherein the third capacitor is configured to provide a reference voltage from the RFID reader to the RFID tag, and wherein the driver circuitry is coupled to the first RFID reader electrode, and the data reception circuitry is coupled to the second RIF reader electrode.

In one example, the data received form the RFID tag may include control data for controlling at least one of the RFID reader, and an apparatus communicatively connected to the RFID reader.

In accordance with another aspect of the present disclosure, a capacitively coupled RFID communications system comprising an RFID tag and an RFID reader is provided. The RFID tag comprises an integrated circuit (IC), the IC including a first RFID tag electrode, a second RFID tag electrode, power supply circuitry configured to extract power from a first time-varying signal received from the RFID reader via at least one of the first RFID tag electrode and the second RFID tag electrode, and supply the extracted power to circuitry of the RFID tag, and data transmission circuitry configured to receive the extracted power from the power supply circuitry, and transmit data to the RFID reader via at least one of the first RFID tag electrode and the second RFID tag electrode. The RFID reader comprises a first RFID reader electrode, a second RFID reader electrode, driver circuitry configured to provide the first time-varying signal to the RFID tag via at least one of the first RFID reader electrode and the second RFID reader electrode; and data reception circuitry configured to receive the data from the RFID tag via at least one of the first RFID electrode and the second RFID electrode, and extract the data from the data carrying signal, and wherein the first RFID tag electrode is arranged to capacitively couple with the first RIFD reader electrode to form a first capacitor and the second RFID tag electrode is arranged to capacitively couple with the second RFID reader electrode to form a second capacitor when the RFID tag is in a first position relative to the RFID reader.

In one example, the driver circuit may comprise a signal generator configured to generate a predetermined signal, and resonant circuitry configured to form a resonant circuit with at least one of the first capacitor and the second capacitor to generate the first time-varying signal based on the predetermined signal.

BRIEF DESCRIPTION OF THE DRAWINGS

Examples of the present disclosure are further described hereinafter with reference to the accompanying drawings, in which:

FIG. 4a illustrates an example arrangement of pads on an inductively coupled RFID tag IC;

FIG. 4b illustrates an example arrangement of electrodes on a capacitively coupled RFID tag IC in accordance with the present disclosure;

FIGS. 5a to 5c illustrates alternative example arrangements of electrodes on a capacitively coupled RFID tag IC in accordance with the present disclosure;

DETAILED DESCRIPTION

A capacitively coupled passive Radio Frequency Identification (RFID) tag operates by receiving a signal from an appropriate RFID reader via a capacitor formed from a plate/electrode at the RFID reader and a plate/electrode at the RFID tag, and utilises the received signal to power its internal circuitry and communicate data to the RFID reader via a predetermined communication technique, such as load modulation for example. Consequently, due to the independent nature of the RFID reader and the RFID tag, reading of the RFID tag is only possible when the RFID reader and the RFID tag are properly positioned with respect to one another such that the electrodes of the RFID reader and the RFID tag align to form one or more capacitors. Although throughout this disclosure two or more capacitors are said to be formed between the RFID reader and the RFID tag such that a signal return path from the RFID tag is provided, in some examples, only a single capacitor may be formed between the RFID reader and the RFID tag with a local return path being used at the RFID tag.

Figure 1:
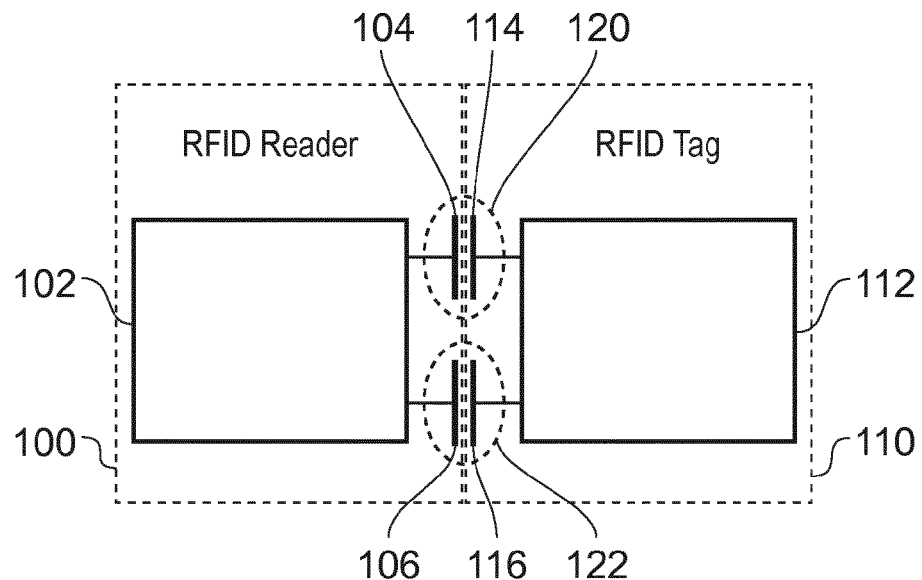
FIG. 1 provides a schematic diagram of a capacitively coupled RFID system.

FIG. 1 provides a schematic diagram of a capacitively coupled RFID system where an RFID reader 100 and an RFID tag 110 are aligned for capacitively coupled RFID communication. The RFID reader comprises circuitry 102 for generating a read/drive signal and receiving data from the RFID tag, and first and second electrodes 104, 106 for forming first and second capacitors 120, 122 with the electrodes of the RFID tag. The RFID tag comprises circuitry 112 for receiving power from the RFID reader and communicating data to the RFID reader, and first and second electrodes 114, 116 for forming first and second capacitors 120, 122 with the electrodes of the RFID reader. In operation, a read signal is transmitted from the RFID reader to the RFID tag via at least one of the capacitors 120, 122. At the RFID tag, power is extracted from the received read signal by power supply circuitry in order to power the circuitry of the RFID tag, and data are communicated to the RFID reader via load modulation, where the load at the RFID tag is varied according to data, for example, by switching in and out different resistances or capacitances, such that the current drawn from the RFID reader via the capacitors 120, 122 varies according to the data, thus allowing the RFID reader to detect the transmitted data.

As set out above, whilst the electrodes of a capacitively coupled RFID tag are typically smaller than the antenna of an inductively coupled RFID tag, the electrodes still present a barrier to miniaturisation since the electrodes are required to be of a size such that sufficient power can be transferred from the RFID reader to the RFID tag, and may be discrete components. More specifically, turning to the capacitor equation $C=\varepsilon \times A/d$, where C is the capacitance, c is the permittivity, A is the capacitor plate area and d is the capacitor electrode separation, power transfer is proportional to C, through the relationship $P=\frac{1}{2} CV^2 \times (frequency)$. Therefore, higher power transfer infers larger capacitors and/or smaller electrode separations, higher RF frequencies, and higher voltages.

RFID Tag

Figure 2:
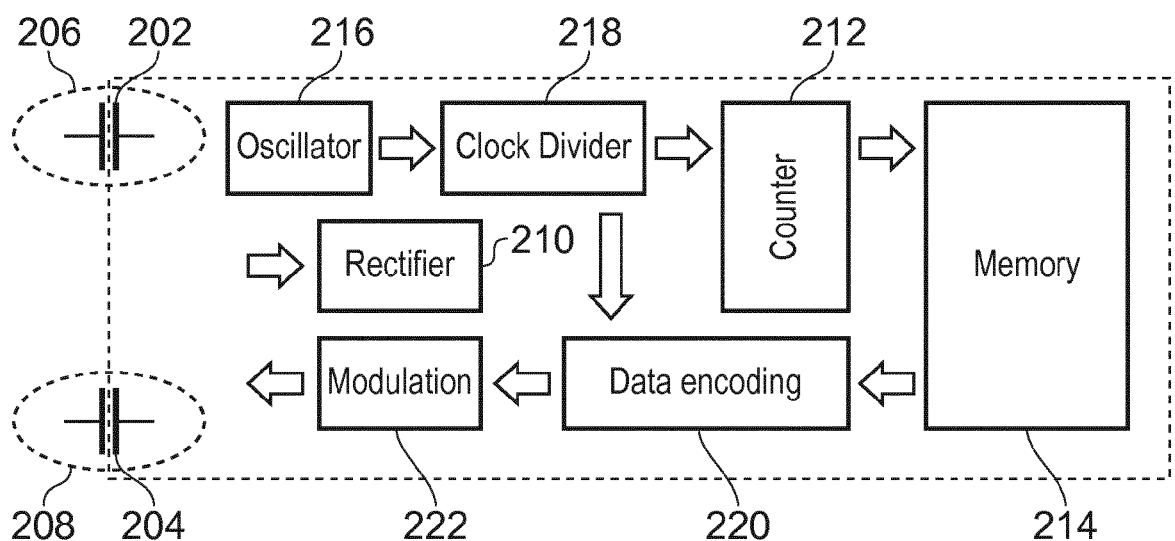
FIG. 2 provides a schematic diagram of a capacitively coupled RFID tag in accordance with an example of the present disclosure.

FIG. 2 provides a schematic diagram of a capacitively coupled RFID tag 200 in accordance with an example of the present disclosure. The RFID tag comprises a first electrode 202 and a second electrode 204 arranged to receive a read or drive signal from an RFID reader when the RFID reader and the RFID tag are positions such that the first and second electrodes of the RFID tag form first and second capacitors 206, 208 with the electrodes of the RFID reader. The signal received from the RFID reader may be of any appropriate frequency or waveform, for example the frequency may be selected from the range of 100 kHZ to 6 GHz, however, the RFID frequencies of Low Frequency (LF) (125 kHz-131 kHZ), High Frequency (HF) (13.56 MHz), and Ultra High Frequency (UHF) (915 MHz) are most commonly used. The waveform may take any applicable form, such as a sine wave, a square wave, or a triangular wave for example.

The RFID tag circuitry may comprise power supply circuitry including one or more of a rectifier 210 for extracting power from the received RFID reader read signal and converting it into a form suitable for powering the circuitry of the RFID tag. The RFID tag may also comprise data processing circuitry comprising a counter 212 and a memory 214 for reading out stored data, where the memory may be programmable read only memory (PROM) for example, and also an oscillator 216 and/or a clock divider 218 for generating a clock signal for operation of the data processing circuitry and the data transmission circuitry. The RFID tag may also comprise a data encoding module 220 and a modulation module 222 for transmitting data stored in the memory to the RFID reader. The data processing circuitry, and the encoding module and modulation module may be collectively referred to as data transmission circuitry. The RFID tag may also comprise one or more further components such as sensors for generating data, data reception circuitry etc. depending on the application of the RFID tag. Although the RFID tag is shown to include an oscillator, in some examples the clock signal may be derived from the signal received from the RFID reader and then divided or multiplied appropriately.

The RFID tag transmits data to the RFID reader via load modulation, where the load modulation may be performed in accordance with any appropriate modulation scheme, such as amplitude shift keying (ASK), frequency shift keying (FSK), phase shift keying (PSK), quadrature amplitude modulation for example. Each of these modulation schemes provide different advantages such as encoding simplicity, decoding simplicity, tolerance to noise/interference, increased data rates etc. and therefore the modulation scheme selected will be dependent on the specific requirements of the application. However, given that RFID is typically used to communicate small volumes of data and fast and reliable reading is often required, the use of FSK would appear to be advantageous due to its increased resilience to noise and other forms of interference. However, in some applications ASK may be advantageous, e.g. for low cost tags and readers, in view of its relative simplicity with respect to modulation and demodulation.

Load modulation operates by switching the loading provided by the RFID tag, which in turn affects the current drawn from the RFID reader, such that the reader can infer the RFID tag data from the current drawn by the RFID tag. This load modulation is typically performed by dynamically switching one or more resistors or capacitors in and out of the circuitry that places a load on the RFID reader. For example, for ASK the loading may be modulated at a predetermined frequency between two loads, where a first load represents a '1' and a second load represents a '0'. For FSK, changes in the frequency of the load switching may convey the data. For example, modulating the load at a first frequency may represent a '0' and modulating the load at a second frequency may represent a '1'. The frequency at which the load is modulated may be referred to as the subcarrier frequency and therefore the modulator 222 of FIG. 2 may perform subcarrier modulation. The subcarrier may be generated by the oscillator of the RFID tag or may be derived from the received read signal, thus allowing a subcarrier or other waveform of a suitable frequency to be generated, such as for example an 848 kHz subcarrier when read signal of 13.56 MHz is used. However, any combination of suitable frequencies may be used.

In addition to load modulation, the data for transmission to the RFID reader may be encoded according to any suitable technique, such a Manchester coding for example. Furthermore, error correction and/or detection coding, such as a cyclic redundancy check (CRC), may also be included in the data.

Figure 3A:
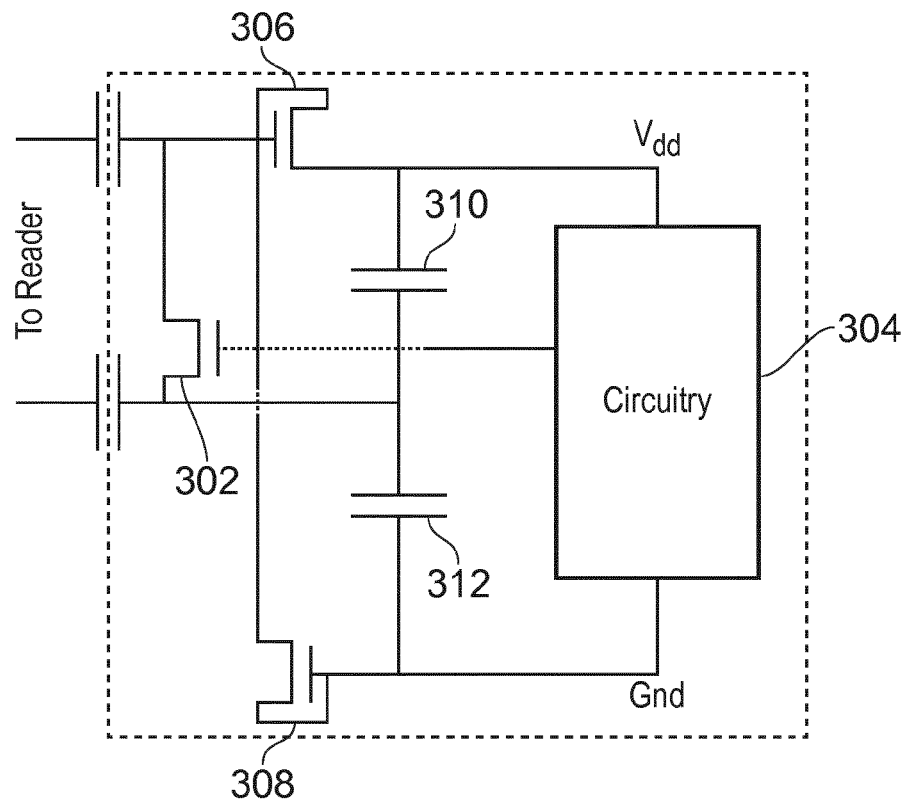
FIGS. 3a and 3b provide schematic diagrams of example implementations of the RF front end of RFID tags in accordance with the present disclosure.
Figure 3B:
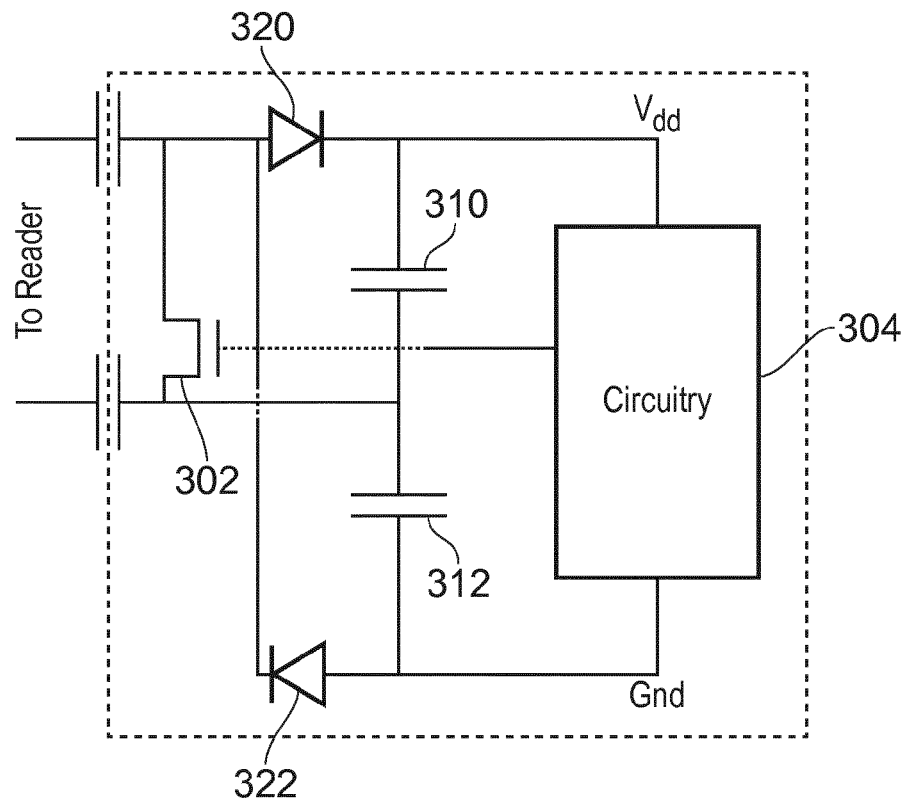

FIGS. 3a and 3b provide schematic diagrams providing example implementations of the RF front end of RFID tags in accordance with the present disclosure.

In FIG. 3a, the load modulation is performed by transistor 302 under control of the circuitry 304, the content of which has been described in detail above with reference to FIG. 2. Rectification and extraction of power from the received RFID reader read signal, and conversion of it into a form suitable for powering the circuitry of the RFID tag, is performed by TFT diodes 306, 308 and capacitors 310 and 312. This particular rectifier implementation is a double half wave rectifier, which may also be referred to as a half-wave voltage-doubling rectifier. However, alternative approaches to the rectification and extraction of power may also be used.

In FIG. 3b, the TFT diodes have been replaced with diodes 320 and 322, where the diodes may be Schottky diodes for example.

The circuitry described above with reference to FIGS. 2, 3a and 3b, including the first and second electrodes 202, 204, may be formed as a part of an integrated circuit (IC) which is separately fabricated and then either attached directly to an item or incorporated into a substrate for attachment to an item. Consequently, the term "RFID tag" may refer to the IC alone or the IC when incorporated into a substrate. The IC may be flexible or substantially rigid and may be constructed from any suitable material. The IC may also include a protective packaging or layer to isolate and/or protect the circuitry of the IC from physical shocks and other environmental conditions.

In an inductive RFID tag, the antenna is external to the IC, with the IC having pads for connecting to the antenna(s). Likewise, for existing capacitively coupled RFID tags, the circuitry may be formed as part of an IC and the IC then connected to separate, external electrodes via pads on the IC. However, this approach may increase both the cost and complexity of manufacture and therefore presents a barrier to the wider application of capacitively coupled RFID communication.

In order to reduce the complexity of capacitively coupled RFID tags, in accordance with an example of the present disclosure, the electrodes of the RFID tag are included in the IC, thus reducing the need for separate electrodes and means for coupling the IC to the electrodes. For example, the electrodes may be formed from separate conductive areas on the outer surface of the IC or IC packaging, or formed from conductive areas positioned under an outer surface or protective coating of the IC in order to protect the electrodes.

FIGS. 4a and 4b illustrate example arrangements of pads/electrodes on an inductively coupled RFID tag IC and a capacitively coupled RFID tag IC, respectively. In FIG. 4a the pads 402 and 404 are present for connecting the IC to an antenna and thus their size is not of significant importance, thus they are relatively small compared to the IC. However, in FIG. 4b the pads 412 and 414 form the electrodes of the capacitors and therefore they are significantly larger so that sufficient power can be transferred from the RFID reader to the RFID tag.

Although the electrodes are illustrated as being on a same outer surface of the IC (or IC packaging) in FIG. 4b, the electrodes may be disposed on any outer surface of the IC or IC packaging. For example, the electrodes made be disposed on a same face or different faces of the outer surface of the IC. Furthermore, in some examples, for example flexible ICs (FlexICs), the IC may not have well-defined packaging and thus the electrodes are disposed on top of the circuitry with suitable insulating materials maintaining appropriate isolation of the electrodes from the circuitry, and, if required, from the external environment. FlexICs may provide especially versatile and low cost RFID tags for integration into the wide range of products. Such FlexICs may be based upon polymer substrates and thin film transistor technology. In some examples the electrodes may be covered by a passivation layer, such as a thin film comprising a polymer-based insulator.

FIGS. 5a to 5c provide three alternative electrodes arrangements in accordance with examples of the present disclosure. However, placement of the electrodes is not limited to only these examples and they may be positioned in any suitable position depending on the application of the RFID tag and the form of the RFID reader. For example, the electrodes may be disposed concentrically on the surface on the IC, or they may take three-dimensional shapes in order to allow alignment with an RFID reader and/or attachment to non-flat surfaces. As noted above, FIGS. 5a to 5c illustrate electrode arrangements for both ICs and RFID tags, as the two may be considered to be equivalent in some examples. For instance, the IC may be used alone to provide RFID communications such that it may also be referred to as an RFID tag. However, in some examples, the RFID tag may include the IC and one or more further components, such as attachment means for example.

In FIG. 5a, the electrodes 412 and 414 are disposed on a same surface of the IC but separated from one another by the circuitry 502 of the IC and/or the substrate or packaging of the IC.

In FIG. 5b, the electrodes 412 and 414 are disposed on a same surface of the IC and on top of the circuitry 502 of the IC and separated by an insulator such as the substrate, passivation or packaging of the IC.

In FIG. 5c, the electrodes 412 and 414 are disposed on opposing sides of the IC with the circuitry 502 of the IC positioned in between the two electrodes.

Although the electrodes are shown to be disposed on the surface of the IC in FIGS. 5a to 5c, the electrodes may also have an additional insulating layer, for example a passivation layer, disposed on them in order to insulate them from unintended contact with conductive surfaces, protect them from damage, external environmental conditions, and/or to increase coupling capacitances via the use of a material with a higher permittivity than that of air. In such examples, the electrodes may be said to be disposed below or directly below an outer surface of the IC or a protective layer disposed around at least some of the IC. Such an additional layer may also take the form of a substrate upon which the IC is mounted, or the packaging of the IC itself.

As set out above, the size of the electrodes partially determines the power transfer capabilities of the RFID tag, with larger electrodes increasing the amount of power that may be transferred when other parameters are unchanged. However, when the electrodes are formed as part of the IC, their size is limited by the size of the IC. Consequently, given that it is generally desirable to reduce the size of an IC, limits may be placed on the size of electrodes and thus the power transfer capabilities of the RFID tag.

In order to mitigate this restriction on electrode size or reduce the size of electrodes and thus ICs without significantly affecting performance, in accordance with an example the present disclosure, the electrodes may be configured to couple (e.g. directly) to a conductive material onto which the IC is mounted. For example, in an application where the RFID tag is attached to the packaging of a product, the packaging may comprise two isolated areas of a conductive material onto which the first and second electrodes of the RFID tag may be mounted and thus electrically connected. Alternatively, the conductive material may form part of the product or article itself. In turn, this will increase the effective areas of the electrodes thus increasing the power transfer capabilities of the RFID tag. Alternatively, by increasing the effective area of the electrodes, the distances at which the RFID tag may be read may be increased.

Figure 6:
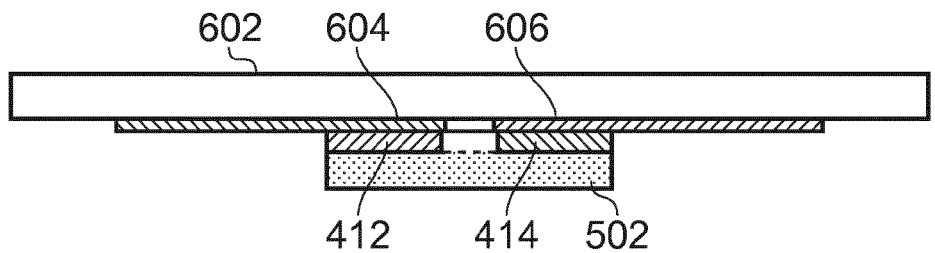
FIG. 6 illustrates an example arrangement of electrodes on a capacitively coupled RFID tag IC in accordance with the present disclosure.

FIG. 6 illustrates an example in which the electrodes that form part of the IC are directly coupled to separate conductive regions of product packaging in order to increase their effective size. The conductive regions may be highly conductive or have a relatively low conductivity. In one example, the conductive regions may be from printed features formed from conductive ink, such as ink including carbon black. Referring to FIG. 6, the product packaging 602 or other suitable surface of a product has areas 604 and 606 of conductive material. The RFID tag IC is attached to the packaging such that electrode 412 is electrically connected to conductive area 604 and electrode 414 is electrically connected to conductive area 606, thus allowing the conductive areas 604 and 606 to act as electrodes of the capacitively coupled RFID tag.

RFID Reader

Figure 7:
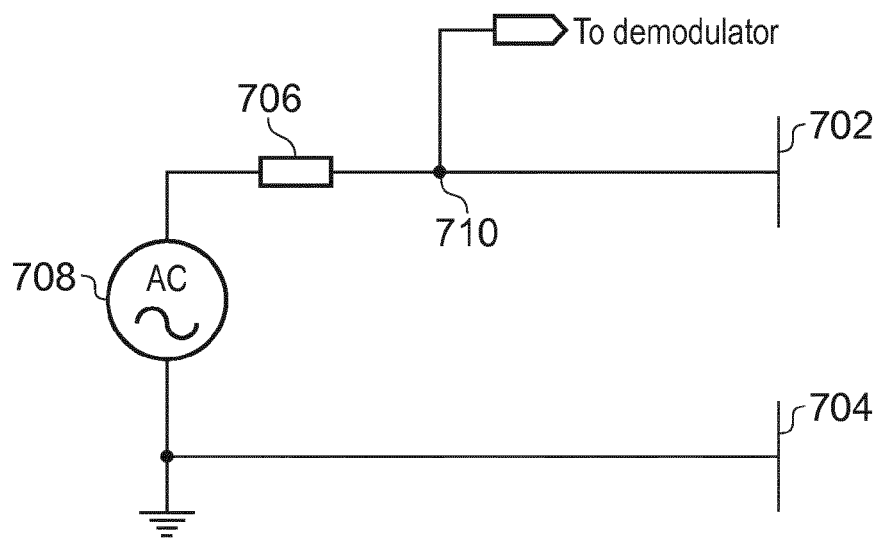
FIG. 7 provides a schematic diagram of a capacitively coupled RFID reader.

FIG. 7 provides a simplified schematic diagram of a capacitively coupled RFID reader. The RFID reader comprises electrodes 702 and 704, an impedance 706, and a signal generator 708. The electrodes 702 and 704 couple with those of an RFID tag when the RFID reader and the RFID tag are appropriately positioned with respect to one another to form capacitors for transmitting the reader signal and receiving data from the RFID tag. The signal generator 708 generates a read signal, which may be any waveform suitable for transmitting power via the electrodes 702 and 704 to the RFID tag. The impedance 706 may be a resistor and is in series with the signal generator, therefore the voltage drop across the resistor provides an indication of the current that is being drawn by the RFID tag though the electrodes 702 and 704. Consequently, when load modulation is performed by the RFID tag as set out above, the voltage drop across the impedance i.e. the voltage measured at point 710 will provide an indication of the load modulation and thus the data being transmitted by the RFID tag. This voltage is therefore sensed and then passed to data reception circuitry including a demodulator, where the voltage signal is demodulated, and the transmitted data extracted. Although, for simplicity of illustration the example RFID readers and RFID tags described are of a 'tags talk only' type, the tags and readers are not limited to such types. For example, data may be encoded in the read signal transmitted by the RFID reader and that data may be received and extracted by the RFID tag. Load modulation performed subsequently by the tag may be dependent on that extracted data.

As set out above with respect to RFID tags, the use of capacitive coupling avoids the use of antennas that are required for inductively coupled RFID communications. However, the amount of power that can be transferred from the RFID reader to the RFID tag is dependent on, among other things, the size of the electrodes that form the capacitors between the RFID reader and the RFID tag. Consequently, the extent to which the RFID tag can be miniaturised is dependent on transferring enough power to the RFID tag for the circuitry of the RFID tag to operate correctly. Although there are likely to be fewer limitations on the size of the electrodes of the reader, the effective capacitance will still be limited by the size of RFID tag electrodes. Therefore, an alternative approach to increasing the power transferred to the RFID tag is desirable.

In accordance with an example of the present disclosure, the amount of power transferred from the RFID reader to the RFID tag is increased by increasing the voltage drop across the capacitors formed by the electrodes of the RFID reader and the RFID tag, where the voltage may be increased by a number of different approaches.

In accordance with a first approach to increasing the voltage, one or more components may be introduced into the reader so that a resonant circuit is formed from resonant components and the electrodes of the RFID reader and the RFID tag. In one example, an inductance may be introduced in series with the signal generator and electrode. However, the RFID reader is not limited to the use of an inductor, for example, active components may be used to form a resonant circuit with the coupling capacitances.

Figure 8:
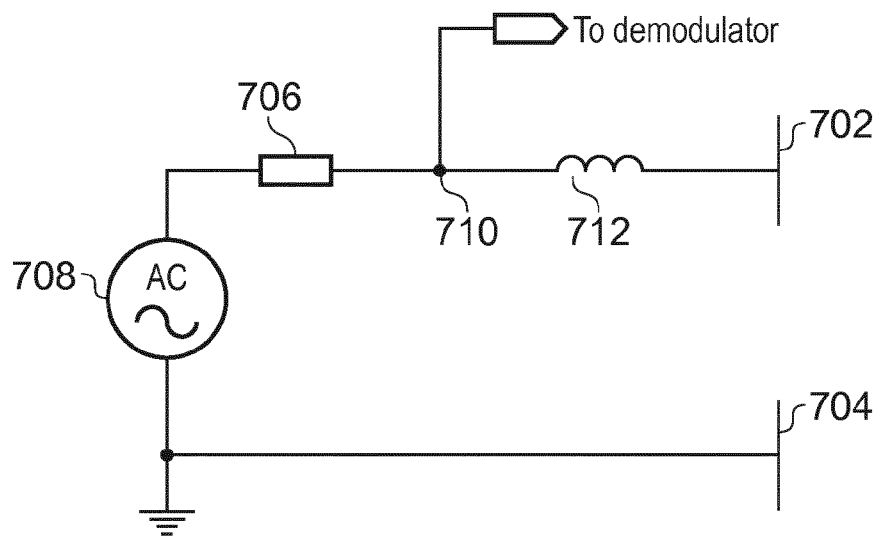
FIG. 8 provides a schematic diagram of an example capacitively coupled RFID reader in accordance with the present disclosure.

FIG. 8 provides an example circuit diagram showing the arrangement of the RFID reader including an inductor 712 to form a resonant circuit with the capacitors formed by the electrodes of the RFID reader and the RFID tag. The value of the inductor is chosen based on the value of the capacitors formed by the electrodes such that the circuit resonates at the desired transmission frequency e.g. 13.56 MHz in accordance with the resonance equation $f_r = 1/2\pi\sqrt{LC}$, where L is the value of the inductor and C is the value of one or more of the coupling capacitances. Consequently, the voltage drop across the capacitor(s) will be increased compared to the voltage of the waveform generated by the signal generator, thus leading to increased power transfer to the RFID tag. The form of such a resonant circuit is not limited to that set out above with respect to FIG. 8, however, any resonant circuit should have a sufficiently high Q factor to enable sufficient power to be provided to the RFID tag via the coupling capacitance(s).

In some examples, an amplifier, such as a class E amplifier, may be used to increase the voltage of the signal generated by the signal generator, where the amplifier is disposed in series between the signal generator and the RFID reader electrode. Alternatively, a step-up transformer may be used to increase the voltage of the signal generated by the signal generator. These alternative approaches for signal amplification may also be combined with a resonant circuit.

Figure 9:
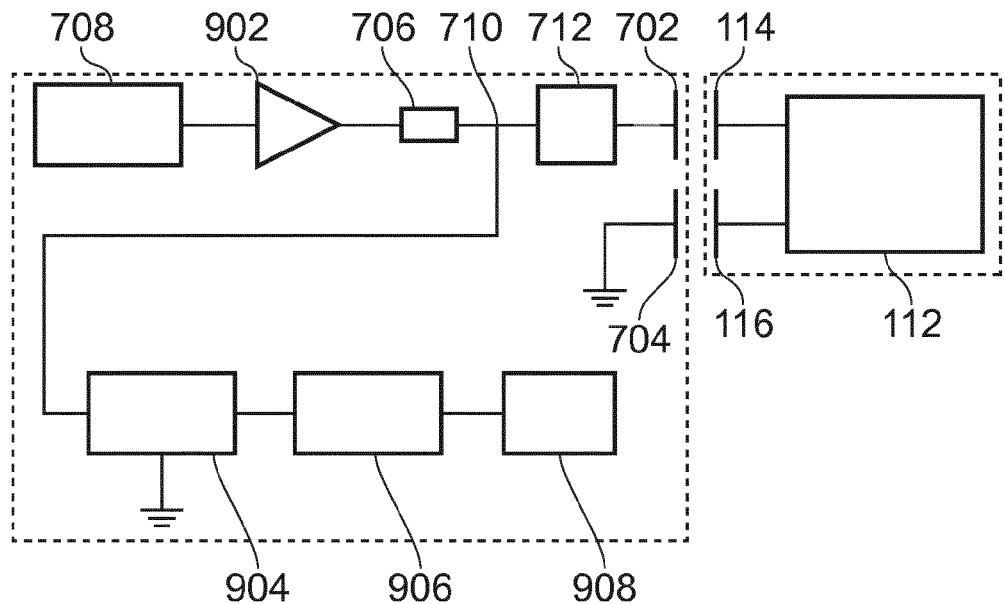
FIG. 9 provides a schematic diagram of an example capacitively coupled RFID reader in accordance with the present disclosure.

FIG. 9 provides a more detailed schematic diagram of an RFID reader in accordance with an example of the present disclosure, where the RFID reader is in a reading position relative to the RFID tag. In addition to the components discussed with reference to FIGS. 7 and 8, the RFID reader further comprises an amplifier 902 for amplifying the signal output by the signal generator, where the amplifier may be used in conjunction with the previous described resonant component 712. The components of the RFID reader for detecting and processing the data transmitted by the RFID tags are also illustrated, where these components may include a filter 904 or a subtraction unit for removing the read/drive signal generated by the signal generator, thus leaving the signal resulting from the load modulation; an amplifier/signal conditioner 906 for converting the signal representing the load modulation into a form suitable to processed by a processor 908, where the processor may include one or more of a decoder, demodulator, and additional control circuitry for extracting the data transmitted from the RFID tag, such as error detection/correction circuitry for example.

The RFID reader may be incorporated into any apparatus that requires capacitively coupled RFID communications capability, such as dedicated reader, a portable communications terminal, an asset identification apparatus for example. In one example, the RFID reader may also be configured to control the operation of devices communicatively coupled to the RFID reader based on the data received from the RFID tag. For example, the RFID tag may provide information on a product or component that has been inserted in or attached to a device associated with the RFID reader and the operation of the device adjusted accordingly. For example, the RFID reader may be disposed in an attachment mechanism and the RFID tag disposed on various attachments which couple with the attachment mechanism. In one example, different attachments for a power tool may be identified via RFID tags disposed upon the attachments such that the power tool may enter different operating modes depending on which attachment is currently coupled to the power tool. Such control operations are equally applicable to any appliance which may cooperate with removable and/or consumable elements that require different modes of operations depending on the removable element, for example, printers, drinks dispensers, electric toothbrushes, medicine dispensers, medicine applicators, etc.

Figure 10:
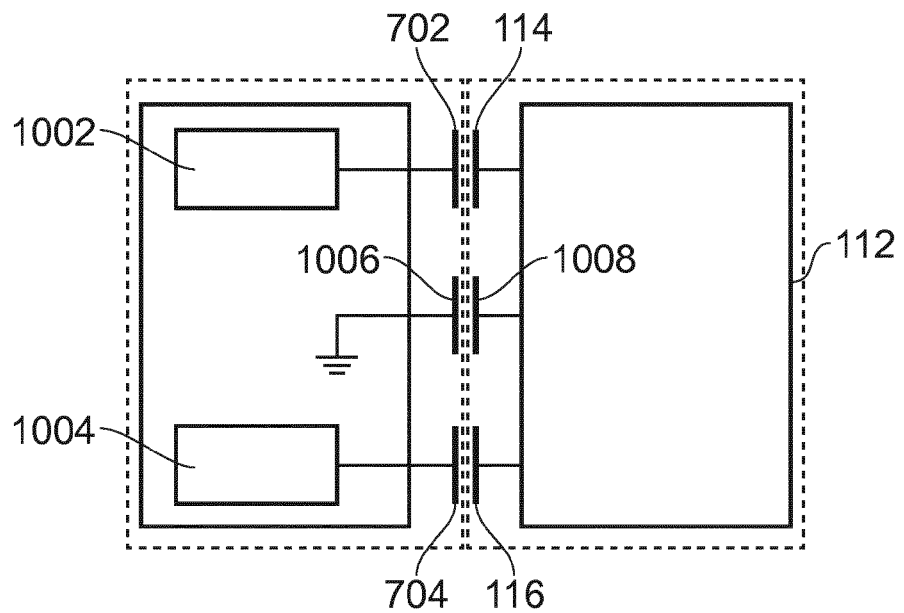
FIG. 10 provides a schematic diagram of an example capacitively coupled RFID reader in accordance with the present disclosure.

FIG. 10 provides a schematic diagram of an RFID reader and an RFID tag in accordance with an example of the present disclosure. Up to now, the RFID reader and the RFID tag have been described as each including two electrodes which form two capacitors when the RFID reader and the RFID tag are appropriately positioned with respect to one another. However, by introducing a third pair of electrodes, a third capacitor can be formed, where the third capacitor can be used to provide a reference voltage between the RFID reader and the RFID tag, thus allowing improved reader accuracy. More specifically, the third capacitor allows some degree of separation of the reader circuit from the driver circuit, with a ground capacitor providing a more stable reference for the circuits in the RFID tag. Such an approach provides improved signal-to-noise performance, allowing smaller and/or more widely separated capacitor electrodes to be used. RFID readers and RFID tags are also not limited to three electrodes/capacitors and may include any number of electrodes/capacitors.

Referring to FIG. 10, the driver circuitry 1002 (e.g. 708, 902, 706, 712) and the reading circuitry 1004 (e.g. 904, 906, 908) are separated within the RFID reader by virtue of the third electrodes of the RFID reader and the RFID tag, 1006 and 1008, providing a third capacitor that provides a reference signal to the RFID tag e.g. a ground signal.

The use of electrodes for capacitively coupled RFID communications as opposed to antennas for inductively coupled RFID communication, and also the use of reduced sized electrodes in the RFID tag also enables greater flexibility in form of the RFID tags and RFID readers. For example, as illustrated in FIGS. 11 and 12 an RFID tag may be placed on an article with rotational symmetry and the RFID reader may be configured to have circular or ring-shaped electrodes, that may be concentrically arranged, for instance, with respect to an axis of the RFID reader, thus enabling the RFID tag to be read regardless of the exact orientation of the article and thus the RFID tag.

Figure 11A:
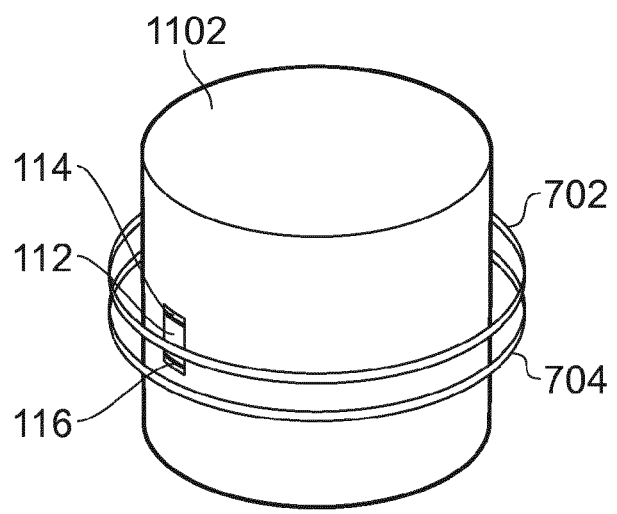
FIGS. 11a and 11b illustrate example arrangements of capacitively coupled RFID readers and RFID tags in accordance with the present disclosure.
Figure 11B:
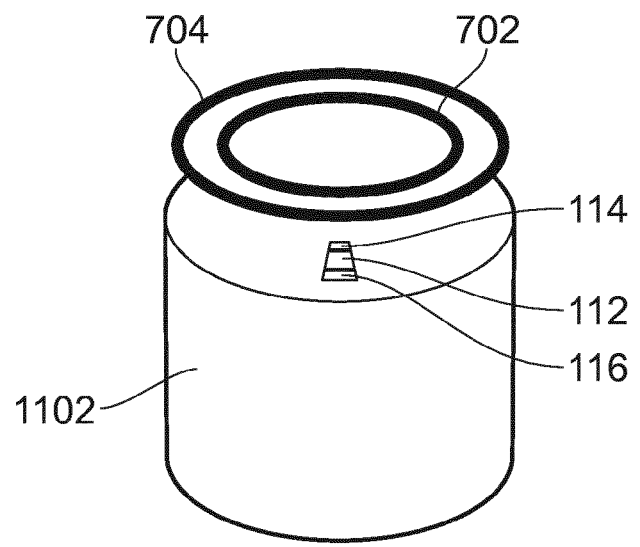

With specific regard to FIGS. 11a and 11b, the tagged object 1102 may be in any rotational position and due to the annular nature of the electrodes 702 704 of the RFID reader, the electrodes 112 and 114 of the RFID tag will align with the electrodes of the RFID reader, thus allowing capacitively coupled RFID communications to take place.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

The above examples are to be understood as illustrative examples of the invention. Further examples of the invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. An RFID tag for capacitively coupled RFID communication with an RFID reader, the RFID tag comprising
   an integrated circuit (IC), the IC including
      a first RFID tag electrode arranged to capacitively couple with a first electrode of the RFID reader to form a first capacitor, and a second RFID tag electrode arranged to capacitively couple with a second electrode of the RFID reader to form a second capacitor when the RFID tag is in a first position relative to the RFID reader;
      power supply circuitry configured to extract power from a first time-varying signal received from the RFID reader via at least one of the first RFID tag electrode and the second RFID tag electrode, and supply the extracted power to circuitry of the RFID tag; and
      data transmission circuitry configured to receive the extracted power from the power supply circuitry, and transmit data to the RFID reader via at least one of the first RFID tag electrode and the second RFID tag electrode.

2. The RFID tag of claim 1, wherein the first RFID tag electrode and the second RFID tag electrode are disposed on or below an outer surface of the IC.

3. The RFID tag of claim 2, wherein the first RFID tag electrode and the second RFID tag electrode are disposed on or below a same face of the outer surface of the IC.

4. The RFID tag of claim 2, where the first RFID tag electrode and the second RFID tag electrode are disposed on or below different faces of the outer surface of the IC.

5. The RFID tag of claim 2, wherein the outer surface of the IC includes an insulating layer.

6. The RFID tag of claim 1, wherein the first RFID tag electrode and the second RFID tag electrode are arranged concentrically.

7. The RFID tag of claim 1, wherein the data transmission circuitry is configured to transmit the data to the RFID reader via load modulation.

8. The RFID tag of claim 7, wherein the data transmission circuitry comprises a modulator configured to perform the load modulation in accordance with one or more of phase-shift keying (PSK), frequency-shift keying (FSK), amplitude-shift keying (ASK), and quadrature amplitude modulation (QAM).

9. The RFID tag of claim 8, wherein the data transmission circuitry comprises circuitry configured to generate a second time-varying signal for performing the load modulation.

10. The RFID tag of claim 1, wherein the RFID tag comprises memory circuitry configured to store the data for transmission to the RFID reader.

11. The RFID tag of claim 1, wherein the RFID tag comprises a third RFID tag electrode configured to capacitively couple with a third electrode of the RFID reader to form a third capacitor when the RFID tag is in a first position relative to the RFID reader, and wherein the third capacitor is configured to provide a reference voltage from the RFID reader to the RFID tag.

12. The RFID tag of claim 1, wherein the RFID tag is configured to be mounted on an external surface of an object, and wherein the first RFID tag electrode is configured to electrically connect to a first electrically conductive area of the external surface to increase the effective area of the first RFID tag electrode, and the second RFID tag electrode is configured to electrically connect to a second electrically conductive area of the external surface to increase the effective area of the second RFID tag electrode.

13. The RFID tag of claim 1, where the RFID tag electrodes are formed from metal.

14. A capacitively coupled RFID communications system comprising an RFID tag and an RFID reader, wherein the RFID tag comprises
an integrated circuit (IC), the IC including
a first RFID tag electrode,
a second RFID tag electrode,
power supply circuitry configured to extract power from a first time-varying signal received from the RFID reader via at least one of the first RFID tag electrode and the second RFID tag electrode, and supply the extracted power to circuitry of the RFID tag, and
data transmission circuitry configured to receive the extracted power from the power supply circuitry, and transmit data to the RFID reader via at least one of the first RFID tag electrode and the second RFID tag electrode; and wherein the RFID reader comprises
a first RFID reader electrode,
a second RFID reader electrode,
driver circuitry configured to provide the first time-varying signal to the RFID tag via at least one of the first RFID reader electrode and the second RFID reader electrode; and
data reception circuitry configured to receive the data from the RFID tag via at least one of the first RFID electrode and the second RFID electrode, and extract the data from the data carrying signal, and wherein the first RFID tag electrode is arranged to capacitively couple with the first RIFD reader electrode to form a first capacitor and the second RFID tag electrode is arranged to capacitively couple with the second RFID reader electrode to form a second capacitor when the RFID tag is in a first position relative to the RFID reader.

15. The RFID communications system of claim 14, wherein the driver circuit comprises a signal generator configured to generate a predetermined signal, and resonant circuitry configured to form a resonant circuit with at least one of the first capacitor and the second capacitor to generate the first time-varying signal based on the predetermined signal.

* * * * *